Nov. 22, 1966  J. E. GLIDDEN  3,286,589
PHOTOGRAPHIC COPYING APPARATUS
Filed Sept. 22, 1964  2 Sheets-Sheet 1
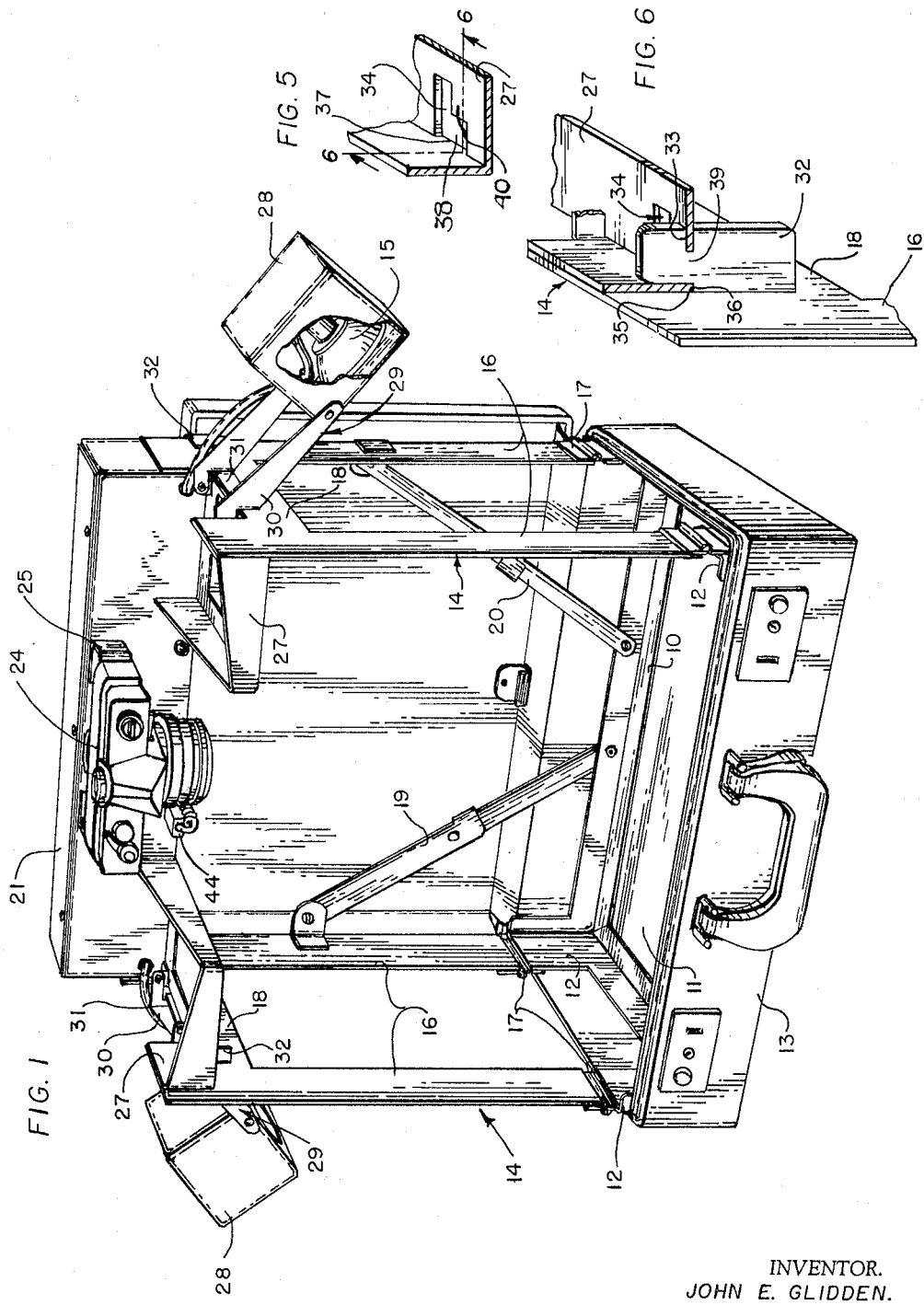
INVENTOR.
JOHN E. GLIDDEN.
BY Harry M. Saragovitz,
Edward J. Kelly, Herbert Berl &
Julian C. Keppler
ATTORNEYS Nov. 22, 1966   J. E. GLIDDEN   3,286,589
PHOTOGRAPHIC COPYING APPARATUS
Filed Sept. 22, 1964   2 Sheets-Sheet 2

INVENTOR.
JOHN E. GLIDDEN.

BY Harry M. Saragovitz,
Edward J. Kelly, Herbert Berl &
Julian C. Keppler
ATTORNEYS

United States Patent Office 3,286,589
Patented Nov. 22, 1966

3,286,589
PHOTOGRAPHIC COPYING APPARATUS
John E. Glidden, Glen Burnie, Md., assignor to the United States of America as represented by the Secretary of the Army
Filed Sept. 22, 1964, Ser. No. 398,460
2 Claims. (Cl. 88—24)

The invention described herein may be manufactured and used by or for the Government for governmental purposes, without the payment of any royalty thereon.

This invention relates to an apparatus for photographically copying documents and the like and particularly to such apparatus which is readily portable and which folds into a small space fitting into an enclosed carrying case.

The invention provides an articulated frame so fabricated that the operating elements may be expanded into operating position and readily folded into a very compact and flat package which fits readily into a carrying case of the type known as attache cases. Thus the copying device may be readily and unobtrusively carried to a remote location. Since the device contains all the elements necessary for copying including lights and the power to operate them it is quickly made ready independently of local power facilities.

The equipment includes a camera preferably of the small format type such as the so-called 35 millimeter type and means to support the camera a measured distance from the document plane. A built in lighting system of the electronic flash type is provided having a pair of electronic flash lamps enclosed in housings pivoted to move outward for operation and to permit retraction to a folded position. The device is divided into two detachable sections an upper and a lower section. The lower section provides the base for the device and defines the copying platen to receive the element to be copied. The lower section also provides folding uprights which support the upper section when it is in operating position.

The upper section provides a housing for the power supply which energizes the lighting system and also the circuitry and controls for the lighting system. This housing supports the camera and has extensions therefrom intergral therewith upon which the lamp housings are pivoted in such manner that they may be swung outward to operating position and inward to folded position when the device is prepared for storing or carrying. In opation the top section is detachably locked to the upper end of uprights extending from the lower section.

For carrying and storage of the apparatus the top section is detached from its uprights and placed in the area of the copying platen of the lower section after which the uprights are folded over the top of the stored upper section.

It is a primary object of the invention to provide a complete photocopying device which is readily carried and is independent of commercial power and lighting facilities.

A further object of the invention is to provide a photocopy apparatus foldable into a compact and flat package which may be carried in a piece of luggage of standard size and construction.

A further object of the invention is to provide a light weight photocopy unit constructed of inexpensive materials and which may be manufactured at small cost.

A further object of the invention is to provide a rugged portable photocopy unit which may be erected into operating position from its compact folded position in fast time.

A further object of the invention is to provide a photocopy unit having a precision lighting system providing even illumination of known and unvarying intensity.

A further object of the invention is to provide a photocopy unit which may be used equally in its carrying case or outside the case.

A further object of the invention is to provide a photocopy unit which is capable of copying large area material such as maps and the like by copying a small section thereof at a time by simply moving the whole device over the surface of the area to be covered.

A further object of the invention is to provide a photocopy unit which is readily folded into a flat compact space and is made in two separable sections so constructed that one section is received within the bounds of the other section when the device is folded in its package.

Other objects and features of the invention will more fully appear from the following detailed description and will be particularly pointed out in the claims.

To provide a better understanding of the invention a particular embodiment thereof will be described and illustrated in the accompanying drawings wherein:

FIG. 1 is a perspective view of the device of the invention extended and ready for operation.

FIGS. 5 and 6 are detail perspective views showing the means for locking together the two sections of the device.

Figure 4:
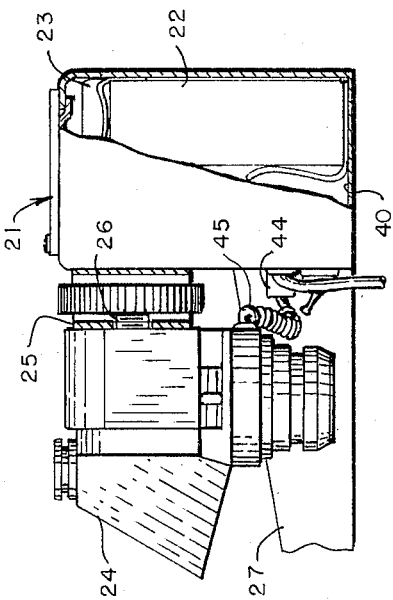
FIG. 4 is a detail view of the means for supporting the camera.

As above stated the device of the invention has two sections which are locked together when in operation and are separable to provide for folding the device into a compact flat package which may be carried in a flat conventional piece of luggage.

The bottom section consists of a base framework 10 of metal preferably heavy gauge aluminum. It is rectangular in form having its side members bent into angle iron cross sectional form. The base thus presents a rectangular opening 11 within which the copy material is placed. The table top or other support defines the focal plane for the element to be copied. Each corner of the base 10 has formed rigidly thereto posts 12. The posts are preferably slightly less in height than the total depth of the carrying case 13. The case 13 may be any suitable construction but desirably may be a standard piece of luggage such as an attache case. A pair of H-shaped upright support members 14 have their depending leg portions 16 hinged to the posts 12 and 17 permitting the support members to fold inward and downward to overlapping horizontal position lengthwise of the frame.

Figure 2:
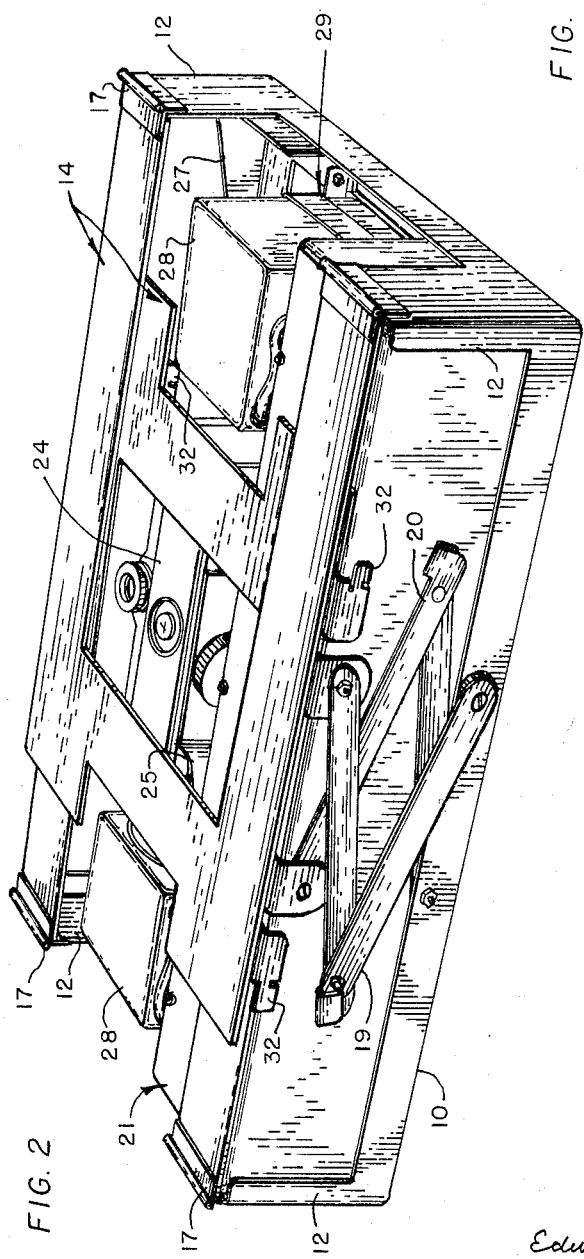
FIG. 2 is a perspective view of the invention in its folded position for carrying or storing.

The supports 14 have integral horizontal cross members 18 near their upper ends which lend rigidity thereto. The members 14 are held in vertical position by articulated diagonal braces 19 and 20. The braces are made in two sections pivoted together near the midsection thereof and are provided with stop means limiting the relative rotation of the sections to 180°. The stops function to limit the motion of the two sections when they are in dead center position. One outer end of each brace is pivoted to the uprights 14 while their other ends are pivoted to one of the side members of the base frame 10. Thus when the uprights 14 are raised to vertical position the braces lock them in this position until their dead center position is released to permit them to fold downward as shown in FIG. 2.

The upper section of the apparatus is separable from the lower part and comprises an enclosed casing 21 containing the components and circuit for powering and controlling the lighting means for illuminating the copy material. These components may be a battery 22 and an electronic flash unit having the conventional capacitor, resistors, relay and control switches interconnected as shown in FIG. 5. Other lighting means may be used such as conventional flash bulbs. The top of the casing is removable to provide access to the components therein.

The casing 21 may also serve to support the camera 24 which may be secured thereto in any desired manner. As shown in FIG. 4 the camera is detachably secured to a bracket 25 fixed to the casing. The bracket is provided with a camera securing screw 26 having a head portion which which when rotated causes the screw 26 to enter the tripod socket of the camera and thus clamp the camera to the bracket. The camera should be positioned with its optical axis at the center of the space 11. Preferably the camera should have a lens whose focal length permits it to be focused sharply on the copy element without the use of a supplementary lens.

The top section also provides the means for supporting two electronic flash lamps 15 together with means for swinging the lamps and housings from operating to folded position. Other types of lighting devices may be used. Any suitable means may be used to support and manipulate the lamps. As shown a pair of shelf like structures 27 are permanently secured to the front face of the casing 21 and serve to hold the lamps and their casings 28 when they are folded for storage and transporting the equipment.

The lamps are swung into operating position upon cradles 29 pivoted upon the support shelfs 27. The cradles have arms 30 extending therefrom between which the lamp housings are pivoted. The legs of the cradles have horizontal connecting struts 31 which engage the support shelves 27 when the arms are positioned approximately 45° from vertical. The housings are swung outwardly from between the legs 30 into a position where the light output therefrom illuminates the area 13 with maximum and uniform intensity. Stops on the housings engage the legs to determine this position.

To prepare the device for operation the carrying case is opened and the device left in the case or lifted out of it. The uprights 14 are then lifted to vertical position and the top section is lifted to its operating position upon the upper ends of the H shaped uprights and locked in position. Any suitable locking means may be used. A suitable means is shown in the drawings. An interlocking lug 32 is formed integrally with each of the legs of the supports 14 or may be secured thereto in any suitable manner such as by welding.

The lugs 32 desirably are made of heavy gauge sheet metal and have their body portions extending inward from the surface of the leg portions of the uprights 14 near the upper portion thereof. A notch 33 is formed in each lug near the top thereof extending horizontally into the body thereof. Coacting L-shaped apertures 34 are cut in the bottom wall of the support shelfs 27 near the forward corners thereof to receive two of the locking lugs while the same shaped aperatures are also cut in the bottom of the casing 21 near the rear corners thereof to receive the other two lugs on the rear leg sections of members 14. These apertures are located directly above the lugs 32 and are so shaped that the lugs enter the apertures. The upper ends of the lugs are narrowed at their upper end by cutting away at 35 to provide space between the upper lug portion and the surface of the uprights to permit the end walls of the shelf like supports 27 to enter as the top section is permitted to move down into its operating position. Also the end walls of the casing move into the space 35 at the two rear lugs. The cut away portions 35 also provide stop shoulders 36 which function to determine the final vertical height of the top section from the plane of the copy member as the edge 37 of the apertures engage the stops 36. The apertures 34 present portions 38 of a size and shape to permit the neck portion 39 of the lug to enter. To lock the two sections of the apparatus the top section is pushed forward about ¼ inch which causes the neck portion of each lug to enter slot section 38 at which time the portion 40 of the bottom walls of the upper section enter the notches 33 in the lugs thus locking the top section firmly to the uprights 14.

Figure 3:
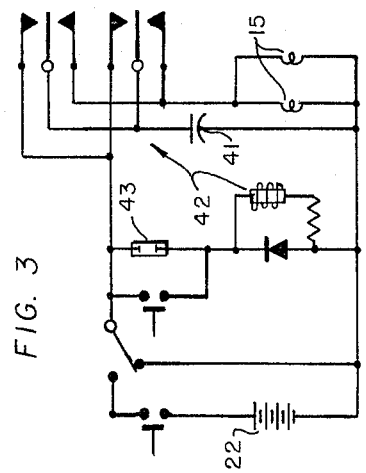
FIG. 3 is a diagrammatic view of the electric circuits and control elements of the device.

The electric circuit for energizing and controlling the operation of lamps 15 may be of any conventional design depending upon the desired operating technique of the apparatus. The circuit shown in FIG. 3 includes the battery 22 and the components making up the flashing unit 23 within the casing 21. The various switches shown provide for proper sequence of steps in operation of the system.

The flash lamps 15 are energized by the discharge of the capacitor 41 which in turn is charged by the battery 22. Charging and discharging of the capacitor 44 is accomplished by the relay 42 which is tripped by the flash synchronizing switch built into the camera shutter. The socket 43 extends through the wall of the casing 21 and is adapted to receive a two terminal plug 44 having a flexible cable 45 connecting it to the synchronizing switch in the camera shutter. The lamps 15 are provided with flexible power cable 46 extending from the casing 21 to the housings 28.

What is claimed is:

1. Folding photographic copy apparatus comprising a base section and an upper section detachably lockable together in operating position, said base section comprising an open rectangular metallic frame to rest upon a flat copy surface and enclosing an area upon which the copy element is placed, said frame having vertical corner posts rigid with said frame and of a height slightly less than the small dimension of the apparatus when folded, a pair of vertical H-shaped support members each member being hinged to the upper ends of opposite pairs of corner posts in such manner that they will fold inward and downward to horizontal position one overlying the other, the upper section comprising an enclosed casing of a length substantially the same as the maximum length of said base frame and fitting within the frame, the said casing being no higher than said corner posts and adapted to receive batteries and electric circuitry for energizing lighting means, a pair of lamps received in said housings, flexible connections from said energizing means to said lamps, a camera secured to said housing, platform supports fixed to said casing, lamp manipulating means pivoted to said platform supports at one end and to said housings at their other end operable to swing said housings from their folded position within the bounds of the folded position of the apparatus and outward to their operation positions.

2. Folding photographic copying apparatus according to claim 1 and wherein the lighting components are of the electronic flash type.

References Cited by the Examiner
UNITED STATES PATENTS
2,813,456   11/1957   Ostrov _____ 88—24

NORTON ANSHER, *Primary Examiner.*

R. A. WINTERCORN, *Assistant Examiner.*